3,642,697
PREPARATION OF POLYETHYLENE 1,2-DIPHENOXYETHANE - 4,4'-DICARBOXYLATE USING STRONTIUM, CALCIUM AND BARIUM COMPOUNDS AS AN ESTER INTERCHANGE CATALYST AND ANTIMONY COMPOUND AS A POLYMERIZATION CATALYST

Hidehiko Kobayashi, Tokyo, and Hiroshi Komoto, Tsurugashima-machi, Iruma-gun, Japan, assignors to Asahi Kasei Kogyo Kabushiki Kaisha, Osaka, Japan
No Drawing. Filed May 28, 1969, Ser. No. 828,785
Claims priority, application Japan, June 3, 1968, 43/37,544
Int. Cl. C08g 17/013
U.S. Cl. 260—47 C        2 Claims

ABSTRACT OF THE DISCLOSURE

This invention discloses a process for the preparation of polyethylene 1,2-diphenoxyethane - 4,4' - dicarboxylate which comprises ester interchanging 1,2-bis(p-carbomethoxyphenoxy)ethane and ethylene glycol in the presence of a strontium, calcium or barium salt of a monocarboxylic acid having 2 to 5 carbon atoms or an orthoborate until methanol no longer evolves, and subsequently polycondensing the resulting ester interchange reaction product in the presence of an antimony compound. Thereby there can be obtained a polyethylene 1,2 - diphenoxyethane-4,4' - dicarboxylate having a remarkedly high crystallization velocity, as compared with the conventionally prepared one. The polyethylene 1,2 - diphenoxyethane - 4,4' - dicarboxylate thus obtained is useful particularly as a material for manufacturing synthetic fibres which are excellent in tenacity, elongation and Young's modulus.

---

This invention relates to an improvement in and relating to the preparation of linear polyethylene 1,2-diphenoxyethane-4,4'-dicarboxylate. More particularly this invention relates to an improved process for the preparation of polyethylene 1,2 - diphenoxyethane - 4,4'-dicarboxylate which comprises ester interchanging 1,2-bis(p-carbomethoxyphenoxy)ethane and ethylene glycol in the presence of a strontium, calcium or barium salt of a monocarboxylic acid having 2 to 5 carbon atoms or an orthoborate and subsequently polycondensing the resulting ester interchange reaction product in the presence of an antimony compound.

Polyethylene 1,2 - diphenoxyethane-4,4'-dicarboxylate is a higher class of polyester in the fields of plastics, textile fibres and films as compared with polyethylene terephthalate, since the former not only has a higher Young's modulus and a higher two-dimensional stability but also is capable of easily forming a high molecular weight polymer. However, it is noted that polyethylene 1,2 - diphenoxyethane - 4,4' - dicarboxylate does, because of ether linkage present therein, exhibit an utterly different behavior with regard to thermal decomposition and crystallization behaviors, as compared with polyethylene terephthalate. For example, although an antimony compound such as antimony trioxide is well recognized in the art as the best polymerization catalyst for manufacturing polyethylene terephthalate, it is not always useful as a polymerization catalyst for manufacturing polyethylene 1,2 - diphenoxyethane-4,4'-dicarboxylate. Stated illustratively, we have found that such antimony compound is very effective for manufacturing polyethylene 1,2-diphenoxyethane - 4,4' - dicarboxylate if a salt of a monocarboxylic acid having 2 to 5 carbon atoms such as strontium acetate, barium acetate or calcium acetate, or a strontium, barium or calcium salt of an orthoborate is used as an ester interchange catalyst. However, when a lead or magnesium salt of a monocarboxylic acid or an orthoborate is employed as an ester interchange catalyst, an antimony compound is not effective as a polycondensation catalyst since the resulting product will be not only low in thermal stability as well as crystallization velocity but also high in amount of terminal free carboxyl groups thereof.

As described above, these two kinds of polyesters, i.e., polyethylene terephthalate and polyethylene 1,2-diphenoxyethane - 4,4' - dicarboxylate, are remarkedly different in property from each other.

Heretofore, in order to promote the crystallization velocity of polyethylene terephthalate, there has been usually added thereto a nucleus increasing agent. By contrast, as a result of the intensive investigation by the present inventors, it has been found that crystallization velocity of polyethylene 1,2-diphenoxyethane-4,4'-dicarboxylate can readily be promoted merely by using a specific combination of catalysts without employing a nucleus increasing agent. The present invention has been made on the basis of such novel finding.

It is an object of the present invention to provide a process for the preparation of polyethylene 1,2 - diphenoxyethane 4,4' - dicarboxylate which is not only excellent in whiteness as well as thermal stability but also high in crystallization velocity.

In more particular aspect, the present invention provides a process for the preparation of polyethylene 1,2-diphenoxyethane - 4,4' - dicarboxylate, characterized in that there is employed a specific combination of catalysts in the reaction procedure consisting of the ester interchange reaction of 1,2 - bis(p-carbomethoxyphenoxy) ethane with ethylene glycol and the subsequent polycondensation reaction, thereby obtaining the polyethylene 1,2 - diphenoxyethane - 4,4' - dicarboxylate having a remarkably high crystallization velocity as compared with the conventionally prepared one, for example having a crystallization velocity of within 1 minute 35 seconds, expressed in terms of isothermal crystallization half-period. The polyethylene 1,2 - diphenoxyethane-4,4'-dicarboxylate thus obtained is particularly useful as a material for manufacturing synthetic fibres which are excellent in tenacity, elongation and Young's modulus.

It has been well known that a molded article of polyethylene 1,2-diphenoxyethane-4,4'-dicarboxylate has a high initial Young's modulus, excellent resistance to hydrolysis by alkali and good dimension stability. However, such polyethylene 1,2-diphenoxyethane-4,4'-dicarboxylate as conventionally known in the plastic field has also several drawbacks to be improved. For example, such dicarboxylate is impossible to mold with a molding interval equivalent to that in case of Delrin (trade name of polyacetal resin manufactured by DuPont, U.S.A.), so that the productivity in molding is very low.

In the field of textile fibres also, the conventionally prepared polyethylene 1,2-diphenoxyethane-4,4'-dicarboxylate gives fibres having a low boil shrinkage of 2% or less, an extremely small heat shrinkage stress and a bad elastic recovery. These fibres have not been preferred in general for use as cloths due to drawbacks such as ruffled appearance of clothes, a bad crease proofness and so on.

Furthermore, in the field of films, transparent and tough films have been produced therefrom by a biaxial drawing method. However, in the detailed investigation of physical properties thereof, it has been found that these films have drawbacks such as a large residual elongation, small strength and insufficient dimension stability. In order to overcome such drawbacks there has been proposed to employ a monoaxial drawing method. However, when the rapidly cooled film which is not drawn is subjected to a thermal drawing by employing the monoaxial drawing method the resulting drawn film has various drawbacks that it is lacking in strength of a transverse direction and that it tends to easily undergo the change to fibrils on heating.

As a result of the intensive investigation made by the present inventors for the purpose of eliminating the above-mentioned drawbacks, it has successfully been found that when 1,2 - bis (p - carbomethoxyphenoxy) ethane is reacted with ethylene glycol in the presence of a strontium, calcium or barium salt of a monocarboxylic acid having 1 to 4 carbon atoms or an orthoborate until methanol no longer evolves, said 1,2-bis (p-carbomethoxyphenoxy) ethane being purified by distillation, to have an acid value of 0.03 or less when measured, by means of titrating with 0.1 N of KOH and phenophthalein an acid component of the solution which is prepared by dissolving with heating 1 g. of 1,2-bis(p-carbomethoxyphenoxy)ethane in 100 g. of ethyl alcohol, and thereafter a polymerization reaction is effected at elevated temperature under reduced pressure in the presence of an antimony compound, there is obtained polyethylene 1,2-diphenoxyethane-4,4'-dicarboxylate which are excellent in various properties as mentioned before.

The linear polyethylene 1,2-diphenoxyethane-4,4'-dicarboxylate of the present invention comprises at least 90 mol percent of repeating units in a molecular chain having the structure of

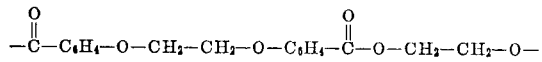

The advantageous effect of the present invention is attained even when the linear polyethylene 1,2-diphenoxyethane-4,4'-dicarboxylate has up to 10 mole percent of another copolymerization ingredient which is ordinarily employed in a polyester.

According to the present invention, in the reaction procedure consisting of the ester interchange reaction of 1,2-bis(p-carbomethoxyphenoxy)ethane with ethylene glycol and the subsequent polycondensation reaction in the presence of a specific combination of catalysts, there can be obtained linear polyethylene 1,2-diphenoxyethane-4,4'-dicarboxylate which is high in thermal stability as well as crystallization velocity and which has terminal free carboxyl groups in an amount of less than 10 moles/$10^6$ g. As an ester interchange catalyst, only a salt of a monocarboxylic acid having 2 to 5 carbon atoms such as strontium acetate, strontium valerate, barium acetate, barium valerate, calcium acetate or calcium valerate; or a strontium, barium or calcium salt of an orthoborate is employable. The use of other metal salts such as lead or magnesium salt of a monocarboxylic acid or an orthoborate as an ester interchange catalyst in combination with the use of an antimony compound as a polycondensation catalyst is not effective, since it will result in the polymer having poor thermal stability, low crystallization velocity and increasing the amount of terminal free carboxyl groups.

The salts of an orthoborate employed in the ester interchange reaction includes, for example, the strontium, barium and calcium salts of boric acid esters having alicyclic group or aromatic group such as orthocyclohexyl borate, ortho phenyl borate, orthocresyl borate and orthodiphenyl borate. Such salt of orthoborate can be prepared by heating, with stirring, a mixture (1:2 by mole) of a glycolate of strontium, barium or calcium with an orthoborate in an inert solvent such as toluene, xylene or dioxane, or in ethylene glycol at 150 to 250° C. for 1 to 2 hours. The ester interchange catalyst may be employed in an amount of 0.005 to 0.5%, preferably 0.01 to 0.2% by weight, based on the amount of the polyester to be formed.

The antimony compounds employed as polycondensation catalyst may be any of those employed in the manufacture of polyethylene terephthalate and include, for example, antimony triacetate, antimony trioxide, antimony pentoxide and antimony fluoride.

Each of them may be employed in an amount of 0.005 to 0.1% by weight, based on the amount of the polyester to be formed.

1,2-bis(p-carbomethoxyphenoxy)ethane employed as a starting material in the present invention must be of such quality that the acid value thereof is 0.03 or less. The use of 1,2-bis(p-carbomethoxyphenoxy)ethane having acid value more than 0.03 will result in the polymer having poor thermal stability, even in combination with the use of the catalysts of the present invention. Although the reason for this is still unknown, this drawback is considered to be possibly due to the contamination with a very small amount of impurities during the course of preparation of 1,2-bis(p-carbomethoxyphenoxy)ethane. Such a quality of acid value as 0.03 or less cannot be attained satisfactorily by only a few rounds of recrystallization from solvent, for instance, recrystallization from toluene, and a number of rounds of recrystallization or purification by the distillation is required.

The purification by the distillation may be carried out in accordance with the known method. Yet, more preferably, the distillation may be carried out with the addition of at least one compound selected from the group consisting of manganese, calcium, magnesium and sodium salts of phosphoric and phosphorous acids; metal oxides such as calcium oxide, magnesium oxide, sodium oxide and manganese oxide; and metals such as manganese, sodium and calcium in an amount of 0.01 to 0.1% by weight, based on the amount of 1,2-bis(p-carbomethoxyphenoxy)ethane, thereby enabling not only the whiteness of the fraction to be improved but also the acid value thereof to be lowered.

In the process of the present invention, the ester interchange reaction and the polycondensation reaction may be carried out in accordance with the known method. In the polycondensation reaction, a gloss destroying agent such as titanium oxide and an anti-coloring agent of a phosphorus compound such as phosphoric acid, phosphorous acid and triphenyl phosphite may be additionally employed without any restriction.

The polyethylene 1,2-diphenoxyethane-4,4'-dicarboxylate obtained in accordance with the present invention can advantageously be made into the desired fibres. Stated illustratively, as opposed to the manufacture of fibres from polyethylene terephthalate wherein if the practically employable fibres are made by simultaneously effecting the spinning and the drawing, a winding rate of more than 3000 m./min. is required, the dicarboxylate of this invention can be made into practically employable fibres at a winding rate of only 2000 m./min., and it has been found that the resulting fibres have a sufficient crystallization velocity, tenacity, elongation and Young's modulus.

In the field of tire cords, the amount of terminal free carboxyl groups in the polymer is important as an index of thermal decomposition. In case of polyethylene terephthalate, there has been taken a special step to reduce the amount of terminal free carboxyl groups to an extent as small as possible. By contrast, according to the present invention, only by employing a specific combination of catalyst, there can be obtained the polymer having terminal free carboxyl groups in an amount of less than 10 moles/$10^6$g.

Moreover, it is noted that the polymer obtained according to the present invention can be molded by means of a metallic die having a temperature of 70° C. or less to produce a high quality and stable molded article which has excellent mechanical properties, particularly a high Rockwell hardness. Furthermore, it is noted that the polymer obtained in accordance with the present invention can be molded by means of metallic die with a shortened molding interval, for example, which is substantially equivalent to that in case of Delrin.

It has been found by the inventors that the crystallization velocity of the polymer obtained according to the present invention is less than 1 minute 35 seconds, expressed in terms of isothermal crystallization half-period at 222° C., and such value is a requirement for the polymer capable of forming an excellent molded article. What influence the variations in combination of ester interchange catalyst with polycondensation catalyst have on the crystallization velocity of the formed polyethylene 1,2 - diphenoxyethane-4,4'-dicarboxylate can be seen from the following Table 1. The isothermal crystallization half-period referred to herein and throughout the present specification shows the crystallization velocity and is defined as the time required until one half of a whole crystallization amount is crystallized when a polymer is completely melted in a cell of differential scanning calorimeter (Perkin Elmer, DSC-1 B) at 300° C. for 5 minutes, then the temperature is lowered to a pre-determined constant temperature, for example 222° C., at a velocity of 64° C./min. The numbers in the Table 1 respectively correspond to the numbers of examples.

by means of a metallic die of 70° C. The molding was carried out by extruding a polymer by means of a screw type extruder at a cylinder temperature of 270° C. under a pressure of 500 kg./cm.$^2$ through a die heated to a temperature of 70° C. for a period of 20 seconds. The time required for one cycle inclusive of enough cooling time to complete the crystallization is shown as the molding interval in Table 2. The viscosity of polymer referred to in said Table 2 shows the reduced viscosity at 33° C. of 0.1% solution of the polymer in a mixed solvent of tetrachloroethane and phenol at a ratio by weight of 3:1. It will be understood from the Table 2 that the polymer having a high crystallization velocity, i.e. within 1 minute 35 seconds in terms of crystallization half-period at 222° C., has a short molding interval and good mechanical properties.

TABLE 2
Relationship between the isothermal crystallization half-period and the Rockwell hardness

| Number | Ester interchange catalyst and amount thereof | Polycondensation catalyst and amount thereof | Viscosity of the polymer | Isothermal crystallization half-period at 222° C. (min. sec.) | Rockwell hardness (scale M) | Molding interval (sec.) |
| --- | --- | --- | --- | --- | --- | --- |
| Example 2 | Ba(OOCCH$_3$)$_2$ (0.09 parts) | Sb$_2$O$_3$ (0.03 parts) | 0.854 | 1′34″ | 100 | 65 |
| Reference Example: | | | | | | |
| 1 | Mn(OOCCH$_3$)$_2$ (0.04 parts) | (C$_4$H$_9$)SnO (0.03 parts) | 0.668 | 5′20″ | 90 | 130 |
| 2 | Zn(OOCCH$_3$)$_2$ (0.03 parts) | Sb$_2$O$_3$ (0.03 parts) | 0.827 | 3′15″ | 91 | 130 |
| 3 | Ca(OOCCH$_3$)$_2$ (0.06 parts) | GeO$_2$ (0.01 parts) | 0.892 | 7′18″ | 89 | 120 |
| 4 | Mg(OOCCH$_3$)$_2$ (0.05 parts) | Sb$_2$O$_3$ (0.03 parts) | 0.825 | 2′12″ | 92 | 100 |
| 5 | Ba(OOCCH$_3$)$_2$ (0.09 parts) | GeO$_2$ (0.01 parts) | 0.923 | 1′48″ | 92 | 80 |

Note.—The reference Examples 1 to 5 were carried out in the same manner as in Example 2, with exception that the catalyts system was varied.

Furthermore it is noted that when the polymer obtained according to the present invention is spun and drawn by the ordinary method, there are obtained drawn fibres which are superior in elastic recovering property, boil shrinkage and maximum heat shrinkage stress. In the following Table 3, there is shown the relationship between the isothermal crystallization half-period at 222°

TABLE 1
Isothermal crystallization half-period (min. sec.)

| Number | Ester interchange catalyst | Polycondensation catalyst | Temperature 222° C. | 225° C. | 232° C. |
| --- | --- | --- | --- | --- | --- |
| Comparative Ex. 1 | Mg(OOCCH$_3$)$_2$ | Sb$_2$O$_3$ | 2′12″ | 4′57″ | 11′52″ |
| Example: | | | | | |
| 1 | Sr(OOCCH$_3$)$_2$ | Sb$_2$O$_3$ | 1′35″ | 3′23″ | 7′30″ |
| 2 | Ba(OOCCH$_3$)$_2$ | Sb$_2$O$_3$ | 1′34″ | 2′33″ | 9′27″ |
| 3 | Sr(OOCCH$_3$)$_2$ | Sb$_2$O$_3$ | 1′32″ | 3′30″ | 7′32″ |
| 4 | Ca(OOCCH$_3$)$_2$ | Sb$_2$O$_3$ | 1′32″ | 2′18″ | 6′33″ |
| 5 | Ba(OOCCH$_3$)$_2$ | Sb$_2$O$_3$ | 1′30″ | 2′20″ | |
| 6 |  | Sb$_2$O$_3$ | 1′27″ | 2′10″ | 7′00″ |
| 7 |  | Sb$_2$O$_3$ | 1′20″ | 2′05″ | |
| 8 |  | Sb$_2$O$_3$ | 1′10″ | 3′03″ | |

In the following Table 2, there is shown the relationship between the isothermal crystallization velocity of the polymer prepared by employing the varied catalyst system and the Rockwell hardness of the molded article made C. and the maximum heat shrinkage stress. The sample was prepared by spinning a polymer at a spinning temperature of 295° C. at an extruding linear velocity of 17 m./min. and at a winding rate of 1000 m./min., and hot-stretching the resulting unstretched filament by 3 times at 140° C. The heat shrinkage stress was measured in air at 20° C. under no tension at a temperature rising velocity of 1° C./min. in accordance with the method of Dr. Kamide [Journal of Fiber Institute, 22, 249 (1966)]. The elastic recovery when elongated was measured by elongating the sample to a definite elongation (for example, 5%) at an elongation velocity of 10%/min., and after holding the elongated sample for one minute, recovering towards the original state at the same rate as in the elongation. Said elongation and recovery were measured along an axis of elongation. The polymers employed are the same as those in the Table 2.

TABLE 3

Relationship between the isothermal crystallization half-period and the maximum heat shrinkage stress

| Isothermal crystallization half-period at 222° C. (min. sec.) | Boil shrinkage (percent) | Elastic recovery when elongated by 5% (percent) | Maximum heat shrinkage stress (g./cm.$^2$ ×10$^{-3}$) |
|---|---|---|---|
| 1′34″ | 6.0 | 90 | 6.6 |
| 5′20″ | 1.2 | 41 | 1.5 |
| 3′15″ | 1.3 | 43 | 1.6 |
| 7′18″ | 1.2 | 46 | 1.4 |
| 2′12″ | 1.5 | 42 | 1.6 |
| 1′48″ | 2.3 | 63 | 2.8 |

Illustrative examples together with reference examples are given below only for the purpose of providing a more detailed explanation of the present invention, but not limiting the scope of the present invention. In the examples, the viscosities of the polymers are expressed in terms of a reduced viscosity measured by using a 0.1% solution of the polymer in a mixture (3:1) of tetrachloethane with phenol at 35° C.

EXAMPLE 1

0.1 part by weight of manganese phosphate was added to 100 parts by weight of 1,2-bis(p-carbomethoxyphenoxy)ethane, whereupon the mixture was subjected to distillation at 230° C. under a pressure of 1 mm. Hg. To 100 parts by weight of the resulting purified and solidified 1,2-bis(p-carbomethoxyphenoxy)ethane were added 75 parts by weight of ethylene glycol and 0.07 part by weight of a strontium acetate as ester interchange catalyst, and the ester interchange reaction was conducted at 220° C. for 4 hours while removing methanol formed as a by-product. Thereafter, 0.03 part by weight of $Sb_2O_3$ together with 0.1 part by weight of triphenyl phosphite as anti-coloring agent were added to the reaction system, whereupon the heating operation was conducted at 280° C. under a pressure of less than 0.1 mm. Hg for 3 hours while removing the ethylene glycol formed. There was obtained a solid polymer having a reduced viscosity of 0.934, a whiteness of Grade 3, a melting point of 249° C. and an amount of terminal free carboxyl groups of 7.3 moles/10$^6$ g. The polymer did not show any coloration even after being heated at 180° C. for 24 hours in air.

EXAMPLE 2

100 parts by weight of 1,2-bis(p-carbomethoxyphenoxy)ethane, which had been purified by distillation with addtion of 0.1 part of metal sodium, and 80 parts by weight of ethylene glycol were charged into an ester interchange vessel to which 0.09 parts by weight of barium acetate as ester interchange catalyst were added. The ester interchange reaction was carried out at 220° C. for 4 hours while removing methanol formed as a by-product. Thereafter, the reaction mixture was transferred into a polymerization vessel, and 0.03 part by weight of $Sb_2O_3$ together with 0.1 part by weight of triphenyl phosphite as a stabilizer were added thereto, whereupon the heating operation was conducted at 280° C. under a reduced pressure of less than 0.1 mm. Hg for 3 hours while removing ethylene glycol formed. There was obtained a solid polymer having a reduced viscosity of 0.949, a melting point of 249° C., a whiteness of Grade 3 and an amount of terminal free carboxyl groups of 9.6 moles/10$^6$ g. This solid did not show any coloration even after being heated

Comparative Example 1

The same operation as described in Example 1 were conducted with the exception that various ester interchange catalysts, namely, manganese acetate, lead acetate and magnesium acetate were employed. The results are given in the following Table 4.

The transparency was determined by examining the turbidity of a breaker plate of the polymer after spun. When the plate was free from turbidity, it was judged as "Good." When the plate had turbidity, it was judged as "Bad."

The thermal coloration was determined as follows: the polymer was heated at 180° C. for 24 hours in air, whereupon the coloration was examined. "⊚" means non-coloration, "XX" means coloration and "O" means slight coloration.

The melting point was measured by means of a differential scanning calorimeter.

The degree of whiteness was expressed in terms of any of five grades 1 to 5. Grade 5 means complete whiteness, Grade 4 means extremely slightly yellowish coloration, Grade 3 means slightly yellowish coloration and Grade 2 means yellowish coloration and Grade 1 means deeply yellowish coloration.

The amount of terminal free carboxyl groups was measured by titrating a solution of the test sample in benzyl alcohol-chloroform solvent system with 0.1 N-sodium methoxide, phenolphthalein as an indicator.

TABLE 4

| Polycondensation catalyst and amount thereof (parts) | Property of the product | Ester interchange catalyst and amount thereof (parts) | | | | | |
|---|---|---|---|---|---|---|---|
| | | Mn(OAc)$_2$ (0.04) | Pb(OAc)$_2$ (0.04) | Mg(OAc)$_2$ (0.07) | Sr(OAc)$_2$ a (0.07) | Ba(OAc)$_2$ b (0.09) | Ca(OAc)$_2$ c (0.07) |
| $Sb_2O_3$ (0.03) | Reduced viscosity | 1.037 | 0.798 | 0.875 | 0.934 | 0.854 | 0.784 |
| | Transparency | Good | Good | Good | Good | Good | Good |
| | Thermalcoloration | X | XX | X | ⊚ | ⊚ | ⊚ |
| | Melting point, ° C | 245 | 246 | 245 | 249 | 249 | 249 |
| | Whiteness | 3 | 2 | 2 | 2 | 3 | 3 |
| | Acid value (mol./10$^6$ g.) | 10.7 | 13.6 | 12.5 | 7.3 | 9.6 | 711 | a Example 1.   b Example 2.   c Example 3.

Comparative Example 2

The same operation as described in Example 1 was repeated with exception that 1,2-bis(p-carbomethoxyphenoxy)-ethane recrystallized a few rounds from toluene to have an acid value of 0.08 was employed. There was obtained a solid having a whiteness of Grade 2, a transparency of "Bad" and a melting point of 248° C. and the thermal coloration thereof was "XX."

EXAMPLE 3

The same operation as described in Example 1 was repeated with the exception that 1,2-bis(p-carbomethoxyphenoxy)ethane recrystallized ten rounds from toluene to have an acid value of 0.02 was employed. There was obtained a solid having a whiteness of Grade 3, a transparency of "Good" and a melting point of 249° C. The solid did not show any coloration even after being heated at 180° C. for 24 hours in air.

EXAMPLE 4

The same operation as described in Example 1 was repeated with the exception that 0.07 part by weight of calcium acetate were employed in place of strontium acetate. There was obtained a white solid having a whiteness of Grade 3, a transparency of "Good" and a melting point of 249° C. The solid did not show any coloration even after being heated at 180° C. for 24 hours in air.

EXAMPLE 5

The same operation as described in Example 2 was repeated with the exception that 0.03 part by weight of $Sb_2O_5$ were employed in place of $Sb_2O_3$. There was obtained a white solid having a whiteness of Grade 3, a transparency of "Good" and a melting point of 248° C. The solid did not show any coloration even after being heated at 180° C. for 24 hours in air.

EXAMPLE 6

The same operation as described in Example 1 was repeated with the exception that 0.2 part by weight of a strontium salt of orthocyclohexylborate represented by the formula

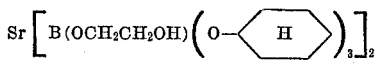

was employed in place of strontium acetate. There was obtained a solid having a melting point of 250° C., a reduced viscosity of 0.798 and a whiteness of Grade 3. The solid did not show any coloration even after being heated at 180° C. for 24 hours in air.

EXAMPLE 7

The same operation as described in Example 2 was repeated with the exception that 0.25 part of a barium salt of orthophenylborate represented by the formula

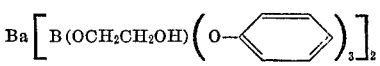

was employed in place of barium acetate. There was obtained a solid having a melting point of 249° C., a reduced viscosity of 0.825 and a whiteness of Grade 3. The solid did not show any coloration even after being heated at 180° C. for 24 hours in air.

Comparative Example 3

The same operation as described in Example 7 was repeated with the exception that 1,2-bis(p-carbomethoxyphenoxy)ethane recrystallized from toluene to have an acid value of 0.04 was used. There was obtained a solid having a whiteness of Grade 3, a transparency of "Bad" and a melting point of 249° C., and the thermal coloration thereof was "XX."

EXAMPLE 8

The same operation as described in Example 6 was repeated with the exception that $Sb_2O_5$ was employed in place of $Sb_2O_3$. There was obtained a white solid having a whiteness of Grade 3, a transparency of "Good," a melting point of 249 C. and a reduced viscosity of 0.892, and the thermal coloration thereof was "◉."

EXAMPLE 9

The same operation as described in Example 7 was repeated with the exception that 0.03 part of antimony acetate were employed in place of $Sb_2O_3$. There was obtained a white solid having a whiteness of Grade 3, a transparency of "Good," a melting point of 250° C. and a reduced viscosity of 0.932, and the thermal coloration thereof was "◉."

EXAMPLE 10

The polymer obtained in Example 9 was extruded at 310° C. at an extrusion-rate of 0.5 g./min. and wound at a winding rate of 2000 m./min. The fibres thus obtained had a tenacity of 5.0 g./denier, an elongation of 57.4%, a refractive index of 0.162 and a density of 1.36 g./cm.$^3$. The boil shrinkage and the maximum heat shrinkage stress of the fibres were 3.6% and 7.6 g./cm.$^2 \times 10^{-5}$, respectively.

EXAMPLE 11

The polymer obtained in Example 5 was extruded by a screw type extruder at a cylinder temperature of 270° C. under an extruding pressure of 500 kg./cm.$^2$ for an injection time of 20 seconds through a die kept at a low temperature of 70° C. The required time for one cycle inclusive of cooling time of the molded article obtained was favourable. The molded article thus obtained had a good surface, a yield strength of 822 kg./cm.$^2$, an elongation of 6%, a breaking strength of 512 kg./cm.$^2$, a break elongation of 22%, a modulus of elasticity of $2.58 \times 10^4$ kg./cm.$^2$, a Rockwell hardness of 100, a density of 1.34 g./cm.$^3$, a thermal deformation temperature of 91° C. and a water content of 0.04%.

What is claimed is:

1. A process for the manufacture of filament and film-forming polyethylene 1,2-diphenoxyethane-4,4' dicarboxylate polyester which comprises:

effecting an ester-interchange reaction between 1,2-bis (p-carbomethoxyphenoxy)ethane having an acid value of 0.03 or less, with ethylene glycol, in the presence of 0.005 to 0.5% by weight, based on the amount of polyester to be formed, of an ester-interchange catalyst until methanol no longer evolves from the reaction mixture, said ester-interchange catalyst being the reaction product obtained by heating and stirring a mixture of one mole of a glycolate of strontium, barium or calcium per two moles of an orthoborate selected from the group consisting of orthocyclohexyl borate, orthophenyl borate, orthocresyl borate and orthodiphenyl borate, in a solvent selected from the group consisting of toluene, xylene, dioxane and ethylene glycol at 150 to 250° C. for 1 to 2 hours, and then polycondensing the ester-interchange product in the presence of 0.005 to 0.1% by weight, based on the amount of the polyester to be formed, of an antimony compound selected from the group consisting of antimony triacetate, antimony trioxide, antimony pentoxide and antimony fluoride, as a polycondensation catalyst, until a film- or fiber-forming polymer is produced.

2. A process for the manufacture of filament and film-forming polyethylene 1,2-diphenoxyethane-4,4' dicarboxylate polyester which comprises:

effecting an ester-interchange reaction between 1,2-bis (p-carbomethoxyphenoxy)ethane having an acid value of 0.03 or less, with ethylene glycol, in the presence of 0.005 to 0.5% by weight, based on the amount of polyester to be formed, of an ester-interchange catalyst having the formula

wherein X is Sr, Ca or Ba, and R is cyclohexyl, phenyl, cresyl or diphenyl, until methanol no longer evolves from the reaction mixture, and then polycondensing the ester-interchange product in the presence of 0.005 to 0.1% by weight, based on the amount of the polyester to be formed, of an antimony compound selected from the group consisting of antimony triacetate, antimony trioxide, antimony pentoxide and antimony fluoride, as a polycondensation catalyst, until a film- or fiber-forming polymer is produced.

(References on following page)

References Cited

UNITED STATES PATENTS

| | | | |
|---|---|---|---|
| 3,391,123 | 7/1968 | Steadly | 260—75 |
| 3,530,098 | 9/1970 | Schweizer et al. | 260—75 |
| 2,465,150 | 3/1949 | Dickson | 260—47 C UX |
| 2,503,251 | 4/1950 | Edwards et al. | 260—47 C UX |
| 2,739,957 | 3/1956 | Billica et al. | 260—75 |
| 2,921,051 | 1/1960 | Amborksi et al. | 260—75 |
| 3,028,366 | 4/1962 | Engle et al. | 260—75 |
| 3,055,870 | 9/1962 | McIntyre et al. | 260—75 |
| 3,070,575 | 12/1962 | Cramer | 260—75 |

FOREIGN PATENTS

| | | | |
|---|---|---|---|
| 579,462 | 8/1946 | Great Britain | 260—47 C |
| 742,811 | 1/1956 | Great Britain | 260—75 |

OTHER REFERENCES

Korshak Polyesters, published New York, New York 1965, Pergamon Press, pp. 153 and 154, OD 341 E 7 K 63.

WILLIAM H. SHORT, Primary Examiner

L. P. QUAST, Assistant Examiner

U.S. Cl. X.R.

260—473 G, 606.5 B